United States Patent [19]
Torrington

[11] Patent Number: 4,472,796
[45] Date of Patent: Sep. 18, 1984

[54] DISC RECORD PLAYER HAVING CARRIAGE LOCKING APPARATUS

[75] Inventor: Leslie A. Torrington, Indianapolis, Ind.

[73] Assignee: RCA Corporation, New York, N.Y.

[21] Appl. No.: 556,251

[22] Filed: Nov. 29, 1983

[51] Int. Cl.³ .................... G11B 3/36; G11B 17/04
[52] U.S. Cl. .................... 369/77.2; 369/219; 369/221
[58] Field of Search .............. 369/77.2, 219, 221, 369/292, 257, 79

[56] References Cited
U.S. PATENT DOCUMENTS

| | | | |
|---|---|---|---|
| 2,566,091 | 8/1951 | Masterson | 369/221 |
| 2,998,255 | 8/1961 | Pfundt | 369/257 |
| 3,271,035 | 9/1966 | Johnston | 369/257 |
| 4,321,702 | 3/1982 | Hughes | 369/77.2 |
| 4,351,046 | 9/1982 | Elliot | 369/221 |

Primary Examiner—Charles Frankfort
Assistant Examiner—Thomas P. Matecki
Attorney, Agent, or Firm—Eugene M. Whitacre; William H. Meise; Dilip A. Kulkarni

[57] ABSTRACT

As a caddy is inserted into the player to load a record therein, it displaces the carriage locking lever to its retracted position to release the carriage. The record retaining spine of the caddy holds the carriage locking lever at the retracted position thereof as long as the record/spine assembly is inside the player. Upon removal of the record/spine assembly from the player, the carriage locking lever moves to its advanced position to arrest the carriage.

6 Claims, 10 Drawing Figures

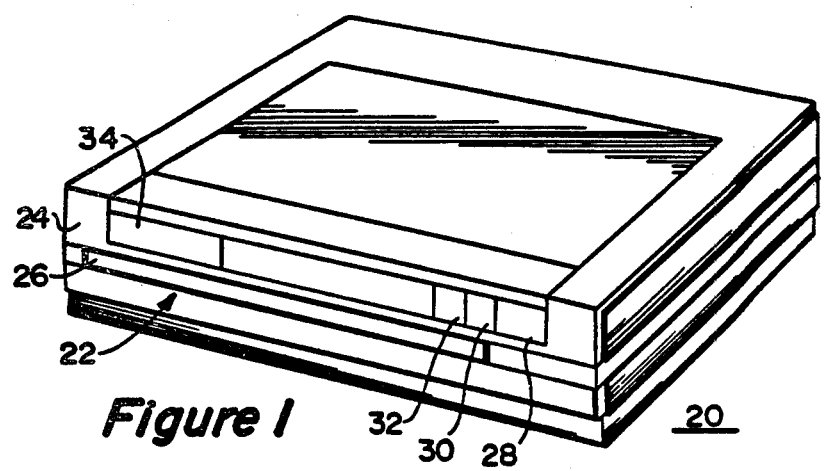
Figure 1
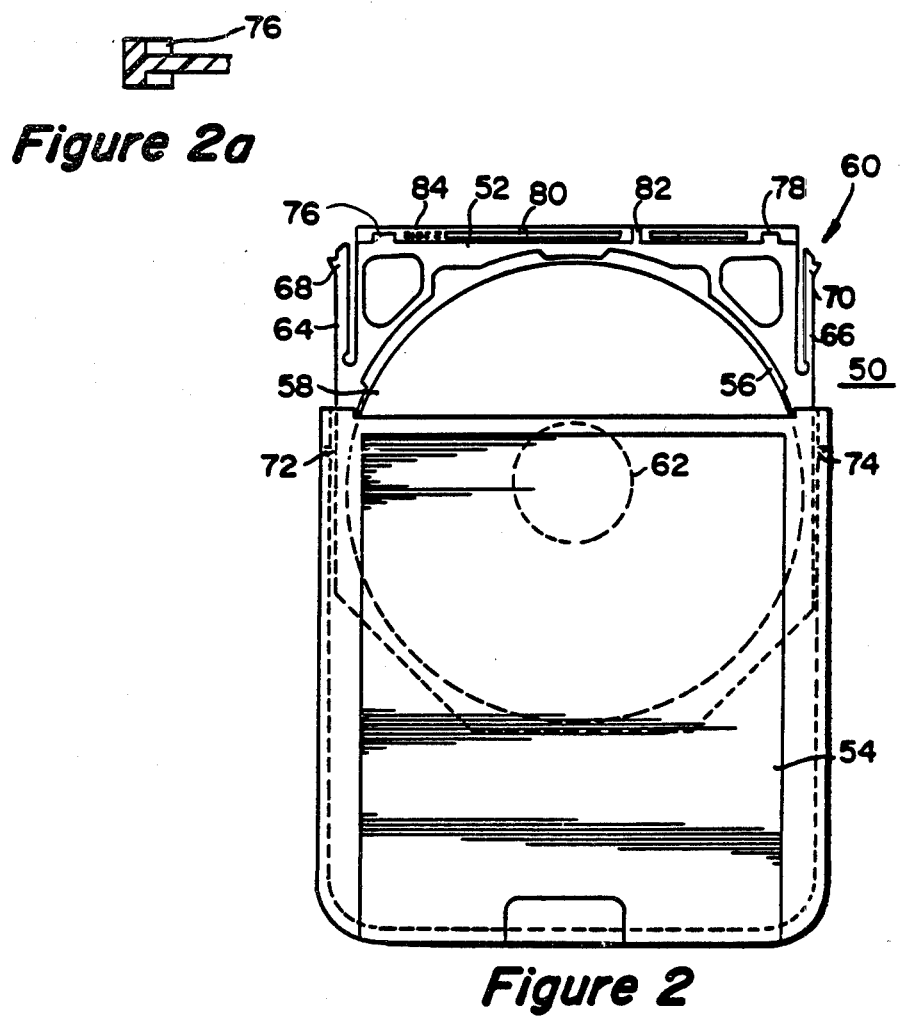
Figure 2a
Figure 2

DISC RECORD PLAYER HAVING CARRIAGE LOCKING APPARATUS

This invention relates to a disc record player, and more particularly, it relates to a disc record player wherein a record is loaded into the player and removed therefrom while it remains encased in its protective caddy.

In certain video disc systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

In the video disc system, the groove density is typically quite high (e.g., groove width=2.5 micrometers approx.). The microscopic groove geometries require a pickup stylus that has rather fine dimensions (e.g., stylus tip width=2 micrometers). The pickup stylus is, therefore, housed in a protective cartridge, which is, in turn, inserted into a carriage housing. The carriage is translatably mounted in the player between an OFF position out of registry with, and an END-OF-PLAY position in registry with a turntable-supported record.

The video disc record is typically enclosed in a protective caddy which comprises an inner record retaining spine removably located within an outer jacket or sleeve. The record retaining spine and an associated record form a record/spine assembly. The record retaining spine is provided with a pair of locking fingers to releasably secure the spine to the sleeve.

For initial record loading, the carriage is arranged at its OFF position and a full caddy is inserted into an input slot provided in the player. When the caddy is inserted into the player, the carriage is driven to a STANDBY position adjacent to the OFF position thereof. A record extraction mechanism disposed in the player removes the record/spine assembly from the sleeve when the sleeve is withdrawn to leave the assembly inside the player resting on a set of record receiving pads. The retained record is lowered to the turntable for playback while the record retaining spine is held in place. The carriage is then quickly advanced to a START-OF-PLAY position in registry with the record, the stylus is brought into engagement with the turntable-mounted record, and the carriage is slowly translated to cause it to follow the radial motion of the groove-guided stylus. After playback, the stylus is separated from the record and the carriage is rapidly driven back to its STANDBY position. The carriage is provided with the STANDBY position to allow the television circuits to remain muted when changing discs. As the carriage is reset, the record is raised back up to redefine the record/spine assembly. For record retrieval, an empty sleeve is reinserted into the player to recapture the record/spine assembly. The caddy is then removed from the player. Upon activation of the off button, the carriage is driven to the OFF position and the player is turned off. U.S. Pat. No. 4,239,108 (Coleman et al.) and U.S. patent application No. 374,378 (Kirschner), respectively disclose a suitable caddy and a record extraction mechanism.

It is desirable to protect the carriage during handling and shipping. Any undue vibrations can cause the carriage to move around, thereby creating a possibility of damaging the carriage support and drive mechanisms. The movement of the carriage can also produce disturbances that could damage the stylus. In Kirschner U.S. patent application Ser. No. 456,334, a removably-mounted carriage locking device is disclosed. The Kirschner locking device is attached to the player at the factory to lock the carriage in place for shipping and transportation purposes. Upon arrival at the final destination, the user removes the locking device from the player to free the carriage.

In accordance with the present invention, a carriage locking mechanism is provided that is automatically defeated to release the carriage during normal operation of the player, thus eliminating the need to manually remove the carriage locking device prior to use. The subject mechanism comprises a carriage locking lever movably mounted in the player between a retracted position and an advanced position respectively in response to the presence of and the absence of a record in the player. The carriage locking lever, when retracted, allows the side-to-side motion of the carriage without hindrance. When advanced, the locking lever engages the carriage to lock it in place.

In the drawings:

FIG. 1 shows a video disc player having a carriage locking mechanism in accordance with this invention;

FIG. 2 illustrates a video disc caddy suitable for use with the video disc player of FIG. 1;

FIG. 2a illustrates a sideview of the cutouts in the spine of FIG. 2;

Figure 6:
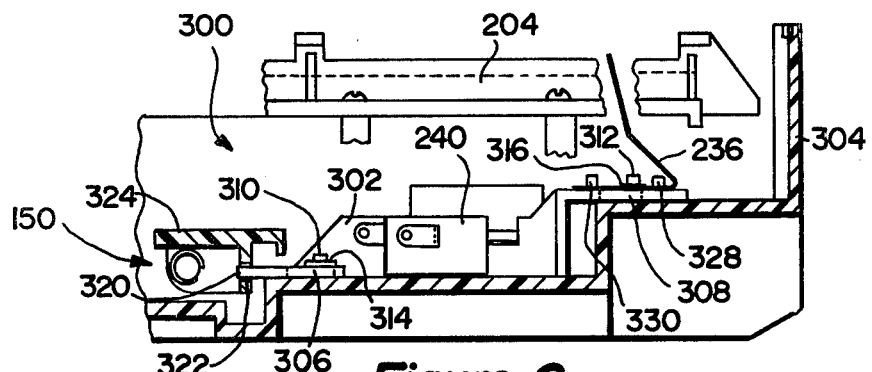
Figure 7:
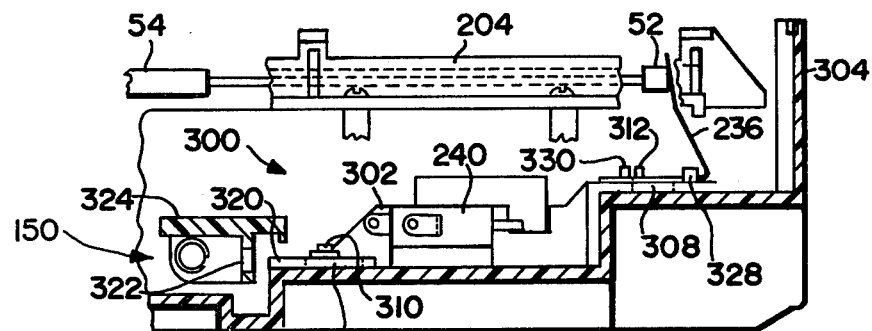
Figure 8:
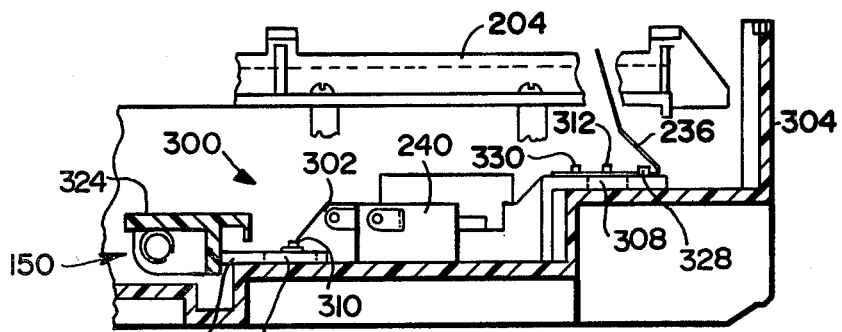

FIGS. 6-8 portray the operation of the subject carriage locking mechanism.

Shown in FIG. 1 is a video disc player 20. To play a disc, a video disc caddy 50, illustrated in FIG. 2, is inserted into an input slot 22 disposed in the front panel 24 of the player. The caddy input slot 22 is provided with a pivotally-mounted door 26 to keep out the debris. The player has a record extraction mechanism 200, depicted in FIG. 5, which withdraws the record/spine assembly from the caddy sleeve and retains it within the player upon retraction of the sleeve. The record is automatically deposited on the turntable, and played back through a conventional television receiver. At any point during playback, the viewer can reject the remainder of the record by depressing the "OFF-/REJECT" button 28. If the user wishes to retrieve the record, an empty caddy is inserted into the player to recapture the record/spine assembly. The program can be interrupted anytime by activating the "PLAY/PAUSE" button 30. The player is equipped with a RAPID ACCESS button 32 to provide rapid forward search (i.e., 240 times normal speed). An LED display 34 indicates elapsed time.

The FIG. 2 caddy 50 consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably capturing the spine in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the FIG. 5 record extraction mechanism 200 are selectively received to secure the spine to the player. The front edge of the spine 52 has slots 80 and 82 in which a side-to-side locating member of the player is received upon caddy insertion to accurately locate the record/spine assembly 60 in the player. The spine 52 is further provided with record side identifying indicia 84.

Figure 3A:
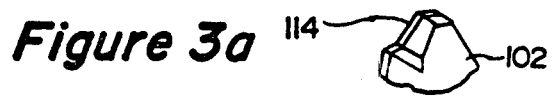
FIG. 3a depicts an enlarged view of the pickup stylus of FIG. 3.
Figure 3:
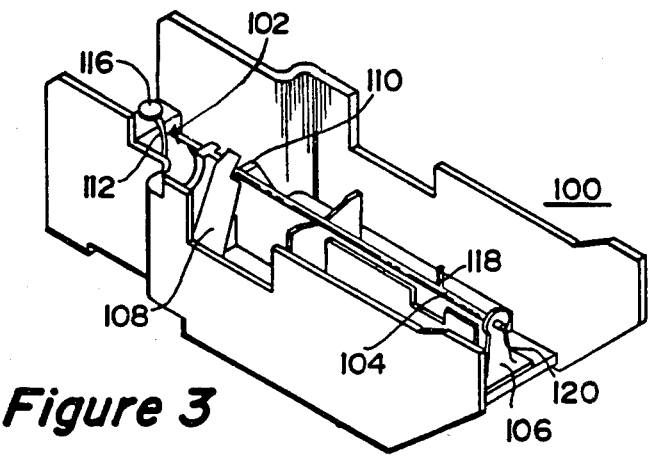
FIG. 3 depicts a pickup cartridge subject to installation in a translatably-mounted carriage of the FIG. 1 player.

As shown in FIG. 3, a pickup stylus 102 is mounted at one end of a stylus arm 104, the other end of which is suspended in a protective cartridge 100 by means of a suspension 106. A pair of retaining members 108 and 110 hold the stylus arm 104 within the cartridge during storage and handling. The retaining members 108 and 110 are defeated to release the stylus arm 104 upon installation of the cartridge in the player. A dual-purpose flylead 112 connects an electrode 114 disposed on the stylus 102 with a terminal 116 on the cartridge. The cartridge terminal 116 is coupled to the player electronics when the cartridge is mounted in the player. The flylead 112 also serves to provide the record/stylus tracking force during play.

Figure 4:
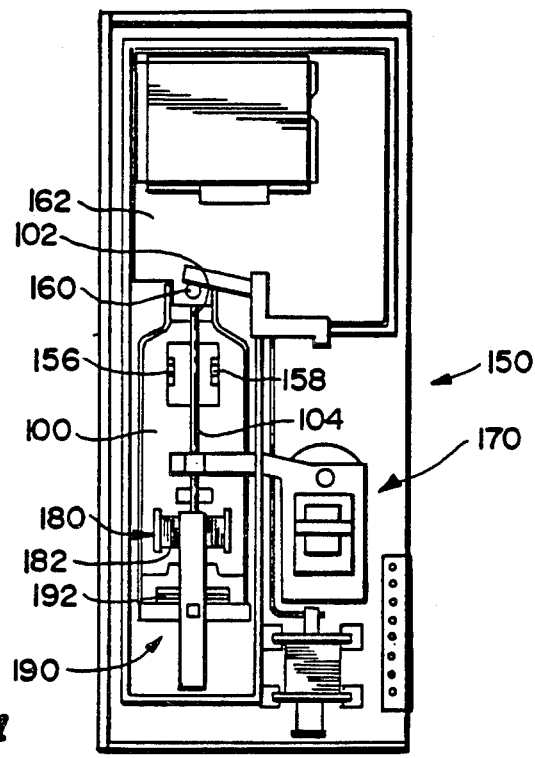
FIG. 4 represents the carriage reciprocably mounted in the player of FIG. 1.
Figure 5:
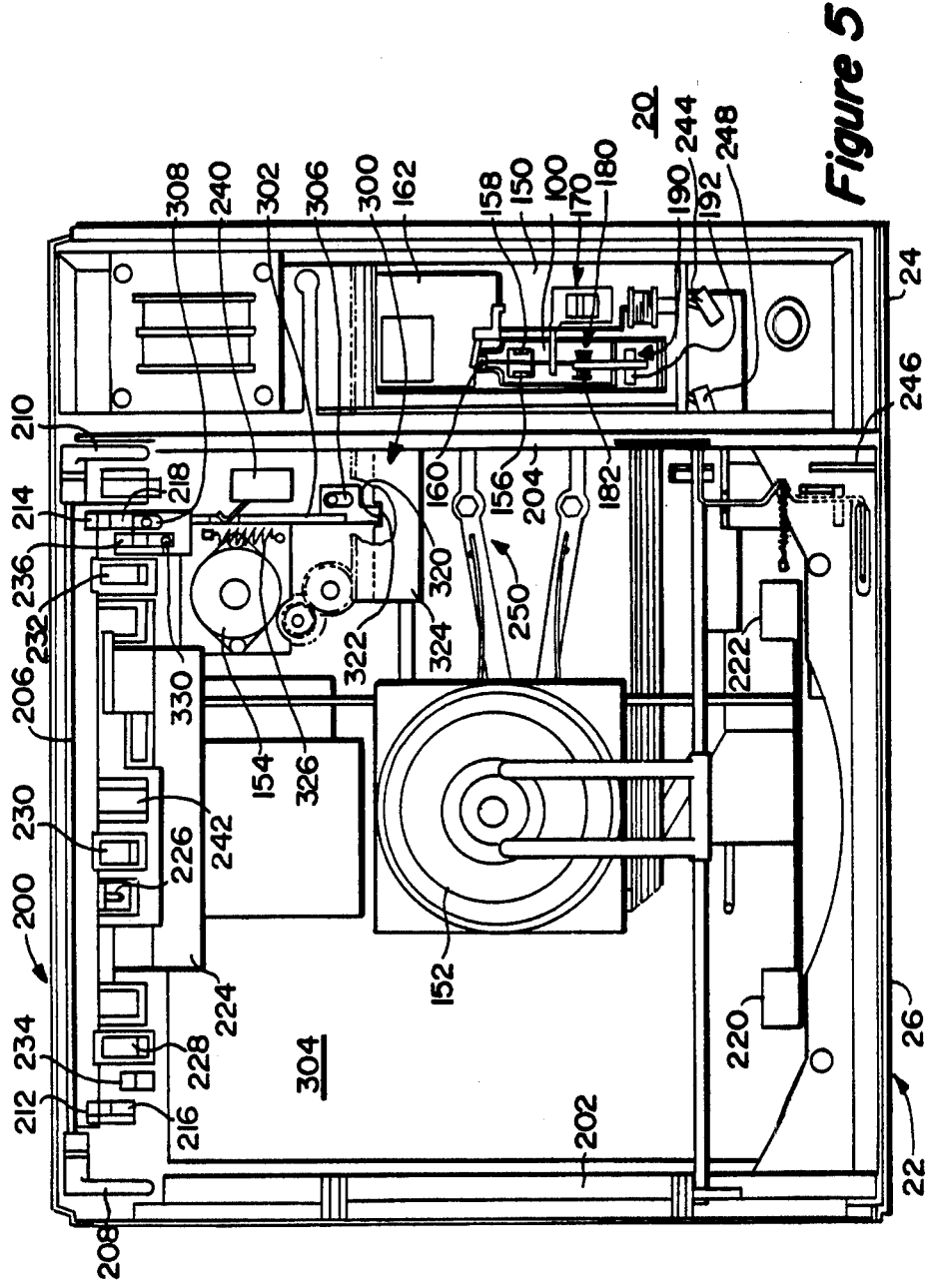
FIG. 5 is a plan view of the video disc player of FIG. 1.

The pickup cartridge is inserted upside down in a carriage 150 in the manner shown in FIG. 4. The carriage 150 is translatably mounted in the player, as indicated in FIG. 5, between an OFF position out of registry with, and an END-OF-PLAY position in registry with a record supported on a turntable 152. A microcomputer-controlled motor 154 selectively drives the carriage 150. Upon installation, a pair of tabs 156 and 158 pry open the retaining fingers 108 and 110 to free the stylus arm 104. The cartridge terminal 116 engages a terminal 160 of the pickup circuits 162 located in the carriage 150 when the cartridge is located therein.

Disposed in the carriage 150 are a number of stylus control mechanisms. The stylus arm lifting/lowering mechanism 170 serves to separate the stylus from a turntable-mounted disc between playbacks, and then allows it to engage the disc for playback. (Refer to U.S. patent application, Ser. No. 449,314, of Brauer.) A groove skipper mechanism 180 comprises a permanent magnet 118 mounted on the stylus arm 104 at right angles to it, and an electromagnet 182 located in the carriage 150 near the skipper magnet. The groove skipper mechanism 180, when activated, serves to displace the stylus 102 laterally of the record, for example, in order to cause the stylus to skip ahead or back. (See U.S. Pat. No. 4,258,233 issued to Simshauser.) Further mounted in the carriage 150 is an armstretcher mechanism 190 including another permanent magnet 120 disposed axially inside the stylus arm 104, and an electromagnet 192 located in the carriage 150 adjacent to it. When signals are applied to the armstretcher electromagnet 192, it produces magnetic fields which interact with the stylus arm-mounted axial magnet 120 to cause front-to-back motion of the stylus arm 104 in a manner opposing the cyclical errors in the stylus/record relative velocity during playback. (Refer to U.S. patent application, Ser. No. 366,644, of Taylor et al.)

To load a record, the caddy 50 is manually inserted into the player through the input slot 22. The front edge of the caddy 50 pushes the spring-loaded retractable door 26 back to make way for the caddy. The player has a set of guide rails 202 and 204, depicted in FIG. 5, for guiding the caddy insertion along a path. The record extraction mechanism 200 serves to extract the enclosed record/spine assembly 60 from the caddy for retention in the player, and to return the retained assembly back to the caddy after playback without the need for touching the record. The record extraction mechanism 200 comprises a cross shaft 206 pivotally mounted near the back end of the player at right angles to the caddy insertion path. Disposed at the opposite ends of the offset shaft 206, and fixedly secured thereto, are a pair of spine releasing members 208 and 210. When the caddy 50 is inserted into the player, the wedge-like portions of the spine releasing members 208 and 210 protrude into the sleeve 54 to deflect the spine locking fingers 64 and 66, whereby the spine 52 is released from the sleeve.

The record extraction mechanism 200 further includes a pair of spine latching members 212 and 214 mounted freely on the cross shaft 206 adjacent to the respective spine releasing members 208 and 210. When the caddy 50 is inserted into the player, it rotates back the hook-like portions 216 and 218 of the spine latching members 212 and 214. A pair of coil springs (not shown) drive the hook-like portions 216 and 218 into the slots 76 and 78 in the spine 52 to lock the spine to the player. The sleeve 54 is then manually extracted, leaving the record/spine assembly 60 inside the player resting on a set of record receiving pads 220, 222 and 224. When the sleeve 54 is withdrawn, a pair of springs, connecting the spine releasing members 208 and 210 and the spine latching members 212 and 214 together, cause the spine releasing members to follow the spine latching members to their respective deflected interim positions. The two spine latching members 212 and 214 are rigidly connected to each other to assure simultaneous latching and unlatching operation of the record extraction mechanism 200.

A side-to-side locating member 226 is driven into the slot 80 disposed in the spine 52 as the caddy 50 arrives at its fully inserted position in the player to assure accurate lateral registration of the spine in the player. The player is further fitted with a pair of brackets 228, 230 and 232 which serve to ensure accurate vertical alignment of the spine 52. Disposed in the player are a pair of stiff leaf springs 234 and 236 which push the spine 52 out to provide accurate front-to-back alignment of the spine.

The player is equipped with an AC switch 240 and a spine sense switch 242, which are activated when the caddy is inserted into the player. These switches 240 and 242 are held in the on position as long as the spine 52 is within the player. The actuation of these switches causes the carriage 150 to move toward a STANDBY position near, and to the right of, the OFF position. Upon arrival at the STANDBY position, the carriage 150 actuates a standby switch 244 to turn off the carriage drive motor 154.

The extraction of the empty sleeve 54 from the player after record loading activates a sleeve sense switch 246 to, in turn, drive the carriage 150 toward the turntable 152. As the carriage 150 moves in, a disc handling mechanism 250 automatically lowers the receiving pads 220, 222 and 224 to transfer the retained record 58 to the turntable 152, while the spine 52 is held in place. The stylus lifting/lowering mechanism 170 permits the stylus 102 to engage the turntable-mounted record 58 when the carriage 150 operates a landing switch 248 as it arrives at the START-OF-PLAY position.

During playback, the carriage motor 154 drives the carriage 110 to follow the pickup stylus 102. Subsequent to playback, the carriage 150 is driven back out to the STANDBY position. As the carriage 150 is reset, the turntable-supported record is lifted back up by the receiving pads 220, 222 and 224 to redefine the record/spine assembly 60.

To recapture the record/spine assembly 60 after playback, the empty sleeve 54 is reinserted into the player. As the caddy sleeve 54 reaches the fully inserted position in the player, its front edge engages and further lifts up the spine releasing members 208 and 210. When the spine releasing members 208 and 210 are raised by the sleeve 54, they, in turn, press against the respective spine latching members 212 and 214 to push the hook-like portions out of the slots 76 and 78 in the spine 52 to release the spine. When the spine 52 is released, the stiff leaf springs 234 and 236 force the spine into the jacket 54 to snap it in place. The caddy is then manually removed from the player. The springs (not shown) rotate the spine latching members 212 and 214 and, in turn, the spine releasing members 208 and 210 downward until the spine releasing member 210 is against a stop (not shown) provided in the player housing, thereby resetting the caddy extraction mechanism 204 for the next cycle.

To switch off the player, the user activates the OFF-/REJECT button 28. The carriage is then driven toward the OFF position. As it reaches the OFF position, the AC switch 240 turns off the player. The player is also programmed to wait for a few minutes after retrieval of the caddy and if no further action is taken in the interim, the carriage 150 is automatically sent to the OFF position, and the player is turned off when it arrives there.

As previously indicated, it is advantageous to lock the carriage 150 in place when the player is in transit. To this end, the player is equipped with a carriage locking mechanism 300, shown in FIGS. 5-8, in accordance with this invention. The subject mechanism 300 includes a carriage locking lever 302 slidably mounted to the player housing 304 between an advanced position indicated in FIG. 6, and a retracted position given in FIG. 7. The carriage locking lever 302 is provided with a pair of elongated cutouts 306 and 308 through which the respective guide pins 310 and 312 integrally-molded with the player housing 304 are passed. A pair of retaining washers 314 and 316 secure the carriage locking lever 302 to the player housing 304.

In the advanced position, one end 320 of the carriage locking lever 302 is received in a notch 322 provided in the carriage support bracket 324, as illustrated in FIG. 6, to lock the carriage 150 in place. A coil spring 326 holds the carriage locking lever 302 at the forward position thereof.

The pushback spring 236 is attached to the carriage locking lever 302 by threading it through a slot in a step portion 328 of the carriage locking lever, and by receiving a locating pin 330 integrally-molded with the carriage locking lever 302 in a hole disposed in the pushback spring. As the caddy is driven into the player, the spine 52 engages the pushback spring 236, and drives it and the carriage locking lever 302 back to the FIG. 7 retracted position to free the carriage 150. The spine 52 holds the carriage locking lever 302 in the retracted position as long as the spine is within the player. The carriage locking lever 302, when retracted, allows the side-to-side motion of the carriage 150 without interference.

As the carriage locking lever 302 is displaced to its retracted position, it actuates the AC switch 240. The spine 52 activates the spine sense switch 242 as it is locked in place. As noted previously, when the AC switch 240 and the spine sense switch 242 are operated, the carriage 150 is driven to the STANDBY position to the right of the OFF position. The removal of the empty sleeve 54 from the player activates the sleeve sense switch 246 to send the carriage 150 toward the turntable 152 for play. Subsequent to playback, the carriage 150 is driven to the STANDBY position indicated in FIG. 8.

To retrieve the record/spine assembly, an empty sleeve 54 is reinserted into the player. Upon removal of the caddy, the coil spring 326 displaces the carriage locking lever 302 to an intermediate position, depicted in FIG. 8, where the end portion 320 of the carriage locking lever rests against a flange portion of the carriage support bracket 324. As the carriage 150 is driven to the OFF position thereof - for example, by actuating the OFF/REJECT button 28 -, the end portion 320 of the carriage locking lever 302 slides into the notch 322 of the carriage support bracket 324 (under the influence of the coil spring 326) to lock the carriage in place. The movement of the carriage locking lever 302 to its advanced position, shown in FIG. 6, turns off the AC switch 240 to, in turn, switch off the player in addition to securing the carriage 150 in place.

The location of the AC switch 240 is such that the carriage locking lever 302 holds it in the on condition except when the carriage locking lever is in the advanced position shown in FIG. 6. This arrangement permits the television circuits to remain muted during disc loading and unloading operations.

The subject carriage locking mechanism effectively protects the carriage assembly during transit. The carriage locking mechanism is automatically defeated upon insertion of a caddy into the player, without the need for manually removing the locking device from the player prior to use.

What is claimed is:

1. In a player for recovering prerecorded information from a turntable-supported disc record by a signal pickup when pickup/record relative velocity is established; said signal pickup being housed in a carriage, which is translatably mounted in said player between an off position out of registry with and an end-of-play position in registry with said turntable-supported record; said record being removably received in a protective caddy which is inserted into said player and then pulled out therefrom to leave an enclosed record inside said player for playback; carriage locking apparatus comprising:

a carriage locking lever movably mounted in said player between a retracted position and an advanced position respectively in response to the presence of and the absence of said record in said player; said carriage locking lever, when retracted, being located such that said carriage is free from hindrance by said lever during said translation of said carriage; said carriage locking lever, when advanced, engaging said carriage to lock it in place.

2. The carriage locking apparatus as set forth in claim 1 for use with said protective caddy comprising a jacket and a record retaining spine; said record retaining spine and an associated record forming a record/spine assembly; said caddy being inserted into said player so that said record/spine assembly can be left inside said player upon withdrawal of said jacket therefrom; said spine engaging said carriage locking lever during said caddy insertion to displace said lever to said retracted position thereof out of the path of said carriage; said spine holding said carriage locking lever in said retracted position as long as said record/spine assembly is occupying said player; said jacket being inserted into said player to retrieve said record/spine assembly from said player subsequent to playback; said carriage locking lever returning to said advanced position upon retrieval of said record/spine assembly from said player to capture said carriage.

3. The carriage locking apparatus as defined in claim 2 further including means for biasing said carriage locking lever toward said advanced position.

4. The carriage locking apparatus of claim 3 wherein said carriage further has a standby position adjacent to said off position thereof out of registry with a turntable-supported record to which said carriage is driven between successive plays; wherein said carriage locking lever has a position intermediate of said advanced and retracted positions thereof; said biasing means serving to displace said carriage locking lever to said intermediate position upon withdrawal of said record/spine assembly from said player when said carriage is at said standby position thereof; said carriage being driven from said standby position to said off position upon retrieval of said record/spine assembly from said player by activating an off button; said biasing means moving said carriage locking lever to said advanced position thereof to seize said carriage as it arrives at said off position in the absence of said record/spine assembly in said player.

5. The claim 4 carriage locking apparatus further including a switch subject to conditioning in an off position and an on position respectively in response to occupation of said carriage locking lever at said advanced position and away from said advanced position; said switch turning off said player upon arrival of said carriage at said off position in the absence of said record/spine assembly in said player.

6. The carriage locking apparatus described in claim 5 further including a spine pushback spring mounted on said carriage locking lever and subject to engagement with said caddy as said caddy is inserted into said player to drive said locking lever to said retracted position thereof.

* * * * *